(12) United States Patent
Tanner

(10) Patent No.: US 6,796,760 B1
(45) Date of Patent: Sep. 28, 2004

(54) RETENTION STRUCTURE FOR A FASTENER

(75) Inventor: Larry P. Tanner, Flint, MI (US)

(73) Assignee: Intier Automotive Inc., Newmarket (CA)

(*) Notice: Subject to any disclaimer, the term of this patent is extended or adjusted under 35 U.S.C. 154(b) by 0 days.

(21) Appl. No.: 10/394,116

(22) Filed: Mar. 21, 2003

(51) Int. Cl.[7] .................... F16B 39/00; F16B 39/284
(52) U.S. Cl. ................ 411/107; 411/104; 411/112; 411/119
(58) Field of Search ......................... 411/104, 107, 411/111, 112, 113, 119, 174, 175

(56) References Cited

U.S. PATENT DOCUMENTS

| | | | | |
|---|---|---|---|---|
| 2,477,429 A | * | 7/1949 | Swanstrom et al. | 411/111 |
| 4,385,858 A | * | 5/1983 | Bell | 411/112 |
| 5,172,608 A | * | 12/1992 | Schultz et al. | 411/112 X |
| 5,193,643 A | * | 3/1993 | McIntyre | 411/104 X |
| 5,558,369 A | * | 9/1996 | Cornea et al. | 411/104 X |

\* cited by examiner

*Primary Examiner*—Neill Wilson
(74) *Attorney, Agent, or Firm*—Honigman Miller Schwartz and Cohn LLP

(57) ABSTRACT

A retention structure includes a retainer housing for retaining an object, such as a fastener, commonly used to secure trim panel to an inner vehicle panel. The retainer housing is defined by a first sidewall, a second sidewall, a back wall, and a base. The first sidewall, the second sidewall and the back wall extend from a substrate to the base. The base includes an insertion slot and a retention portion for retaining the fastener. The retention portion includes at least one cutout for increasing the flexibility of the base. The retainer housing also includes a holding arm integral to the retainer housing. The holding arm acts provides a biasing force on the fastener once the fastener is inserted into the retaining portion and restrains lateral movement of the fastener. This abstract submitted with the understanding that it will not be used to interpret or limit the scope or meaning of the claims.

19 Claims, 4 Drawing Sheets

RETENTION STRUCTURE FOR A FASTENER

TECHNICAL FIELD

The present invention relates to a retention structure for a fastener and in particular to a retention structure that retains fasteners with a spring-loaded holding arm.

BACKGROUND OF THE INVENTION

It is well known to use fasteners for connecting a trim panel to an inner panel of a vehicle. One common type of fastener is the "Christmas-tree" type fastener. This type of fastener is attached to the trim panel at the site where the trim panel is manufactured. Once attached, the trim panel and fasteners may be shipped to a different location where assembly of the trim panel and fasteners onto the vehicle takes place. During shipment the fasteners may fall off the trim panel and cannot be reinserted into the trim panel because the retention force is lost. The advantages of pre-assembling the trim panel and fasteners are not realized.

SUMMARY OF THE INVENTION

The inventors of the present invention have recognized these and other problems associated with conventional retention structures for fasteners. To this end, the inventors have developed a retention structure comprising a retainer housing defined by a first sidewall, a second sidewall, a back wall, and a base. The first sidewall, the second sidewall and the back wall extend from a substrate to the base. The retention structure further comprises an insertion slot, a retention portion, and a holding arm.

In another embodiment of the invention, a retention structure comprises a retainer housing defined by a first sidewall, a second sidewall, a back wall, a base. The first sidewall, the second sidewall and the back wall extend from the substrate to the base. The base includes an insertion slot and a retention portion. The retention portion includes at least one cutout on the base of the retainer housing.

In another embodiment of the invention, a fastener assembly comprises a substrate, a retainer housing defined by a first sidewall, a second sidewall, a back wall and a base, and a holding arm attached to the retainer housing. The first sidewall, the second sidewall and the back wall extend from the substrate to the base. The base includes an insertion slot and a retention portion. The retention portion includes at least one cutout on the base of the retainer housing

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
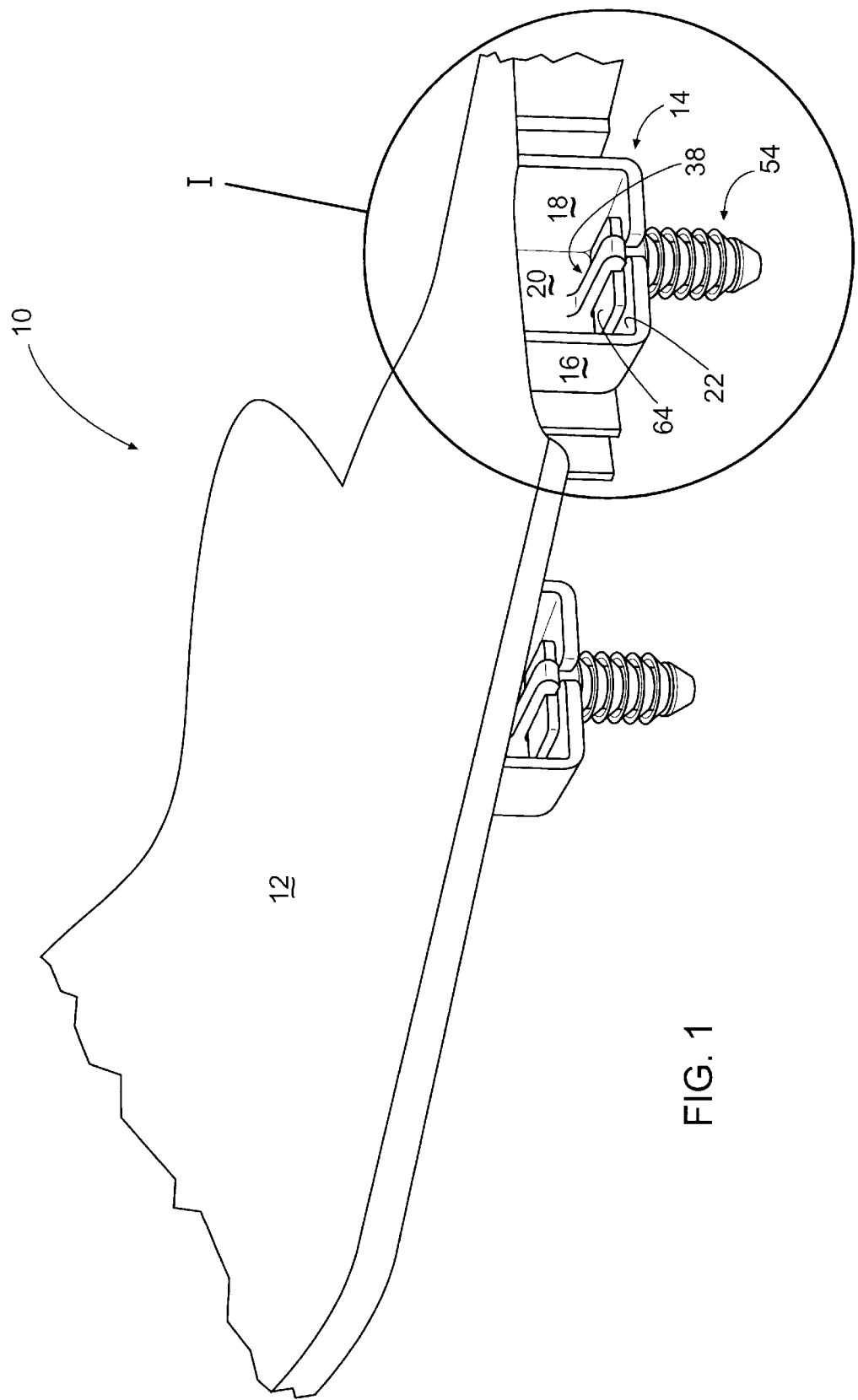
FIG. 1 is a perspective view of a substrate and a retention structure retaining a fastener according to an embodiment of the invention.
Figure 2:
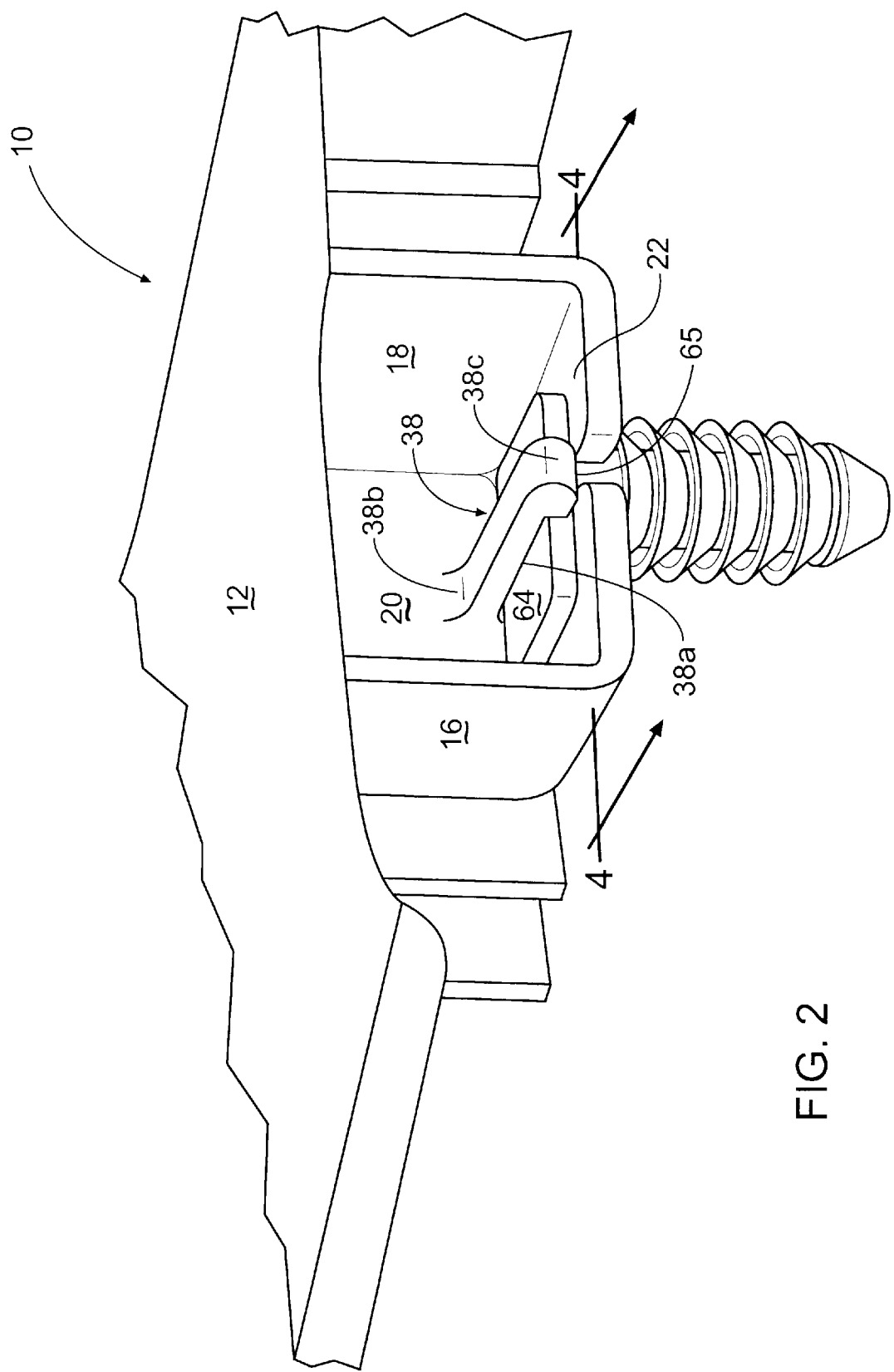
FIG. 2 is an enlarged view of region I of FIG. 1.

Referring now to FIGS. 1 and 2, a retention structure, generally shown at 10, is shown according to an embodiment of the invention. In general, the retention structure 10 comprises a substrate 12 and a retainer housing 14 extending away from the substrate 12. Preferably, the retention structure 10 and the substrate 12 are integrally formed of a molded plastic material, or the like. In the illustrated embodiment, the retainer housing 14 is defined by a first sidewall 16, a second, opposing sidewall 18, a back wall 20 and a base 22. It may be appreciated that the retention structure is not limited to the shape of the preferred embodiment and can be of any desired shape. The first sidewall 16, the second sidewall 18, and the back wall 20 extend downward from the substrate 12 to the base 22, thereby joining the base 22 to the substrate 12. In the illustrated embodiment, the base 22 is substantially parallel to the substrate 12. However, it can be appreciated that the base 22 does not have to be substantially parallel to the substrate 12.

Figure 3:
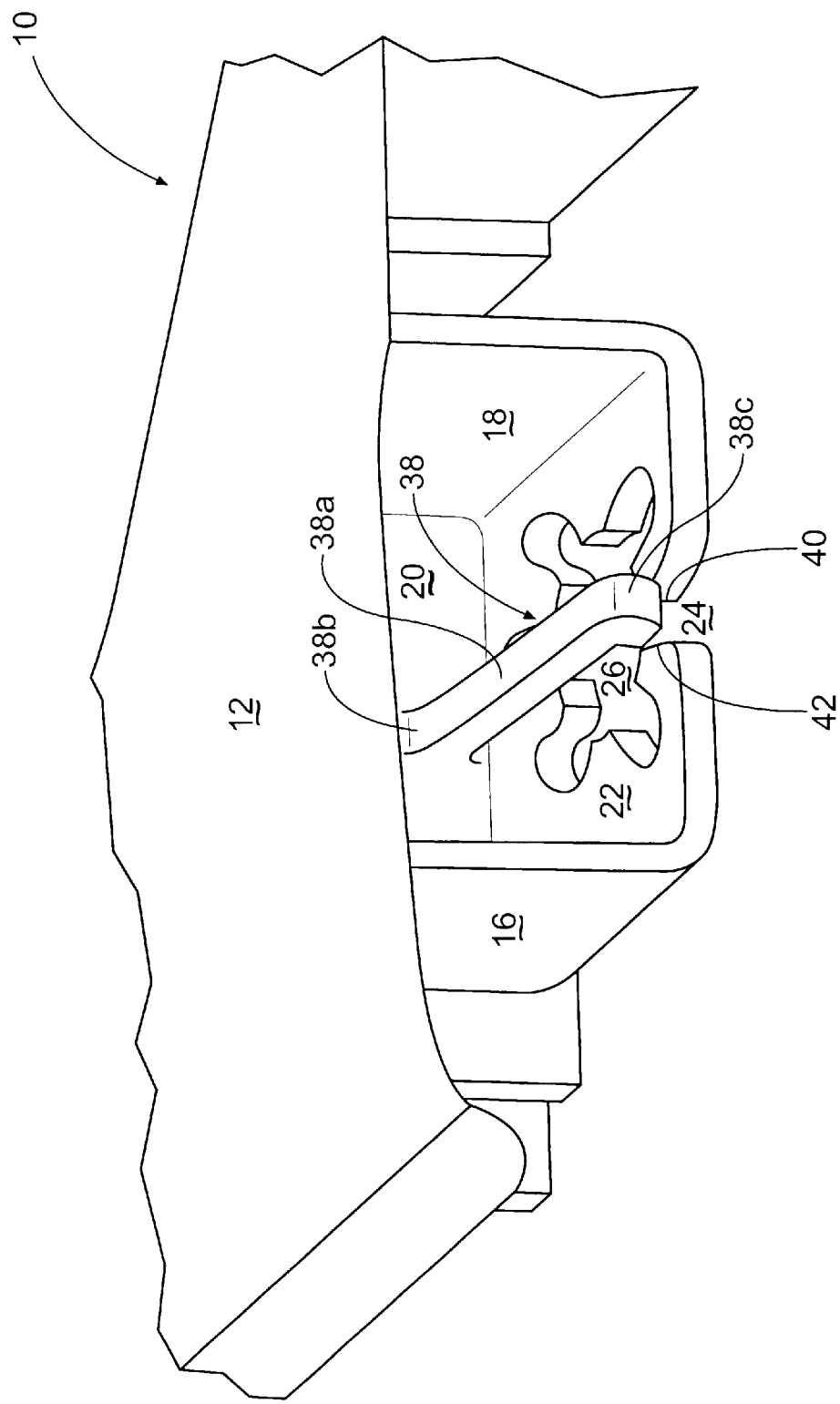
FIG. 3 is a perspective view of a retention structure of FIG. 1 with the fastener not shown for clarity.
Figure 4:
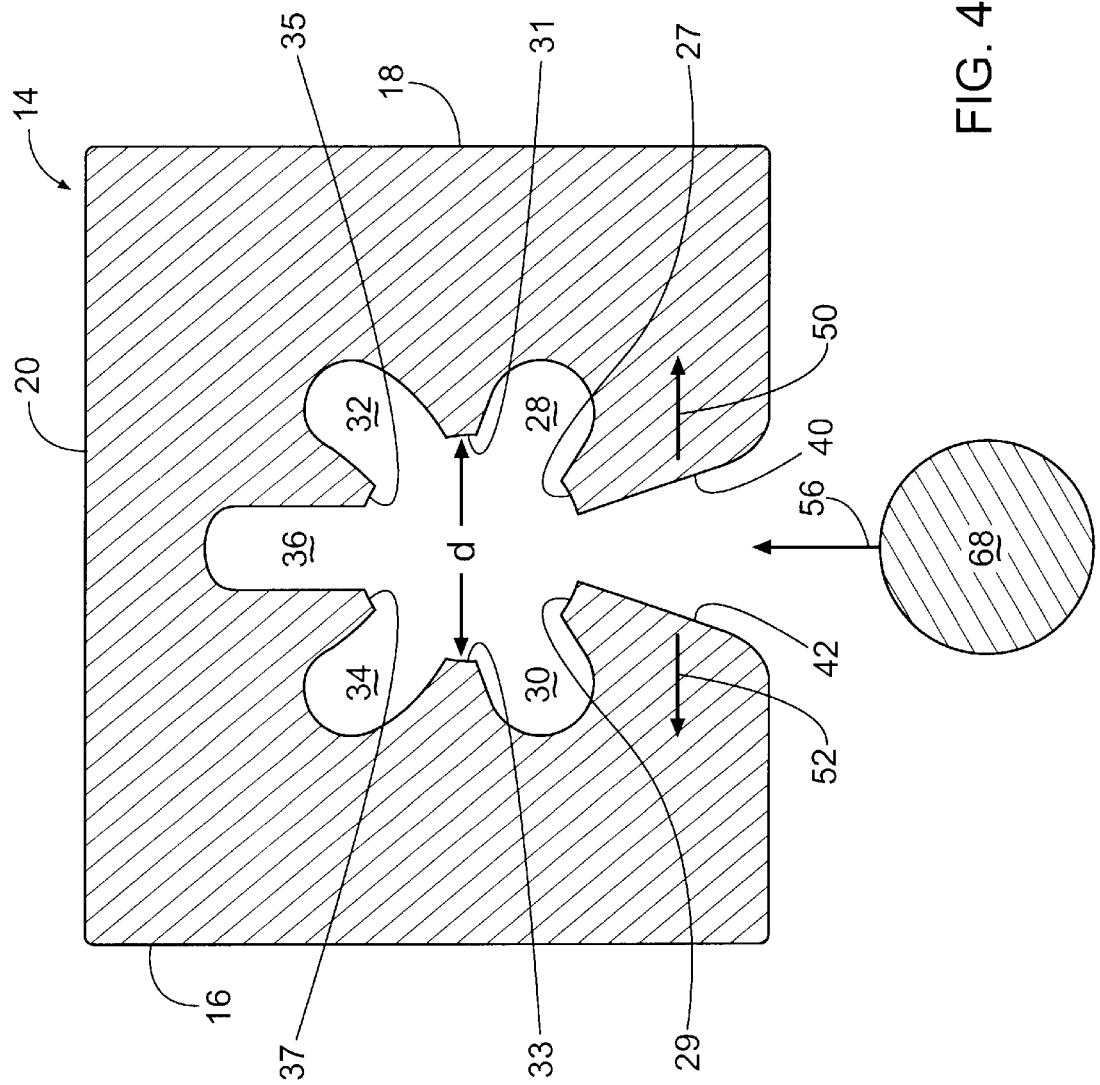
FIG. 4 is a cross section view of a retention structure taken along line 4—4 of FIG. 2.

Referring now to FIGS. 3 and 4, the base 22 of the retainer housing 14 includes an insertion slot 24 and a retention portion 26. The insertion slot 24 is defined by a first wall 40 and a second wall 42 that may be angled inwardly toward each other to help guide the fastener 54 when the fastener 54 is inserted into the retention portion 26 in the direction shown by arrow 56 in FIG. 4. However, the invention can be practiced without the first and second walls 40, 42 being angled with respect to each other. The retention portion 26 includes walls 27, 29, 31, 33, 35 and 37 which define a substantially circular shape, d, on the base 22 that corresponds to the circular cross-sectional shape of stem 68. The substantially circular shape, d, is slightly larger than the diameter of the stem 68 to allow the first and second walls 40, 42 to return to their initial position after the fastener 54 is inserted into the retention portion 26. The retention portion 26 further includes one or more cutouts, for example, as in the illustrated embodiment, cutouts 28, 30, 32, 34, and 36 that form a star-like shape configuration extending from the substantially circular shape, d. The cutouts 28, 30, 32, 34, and 36 can have any desired shape, for example, cutouts 28, 30, 32 and 34 can have a substantially circular shape, while cutout 36 can have a substantially rectangular shape. The cutouts 28, 30, 32, 34, and 36 provide flexibility to the base 22 to allow the first and second walls 40, 42 to angle away from each other, as shown by arrows 50 and 52 respectively, when the fastener 54 is inserted into the retainer housing, 14. It will be appreciated that the invention is not limited by the number of cutouts, and that the invention can be practiced with any desired number of cutouts that will provide the additional flexibility to the base 22 to allow the fastener 54 to be easily inserted into the retainer housing 14.

The retainer housing 14 also includes a holding arm 38. The holding arm 38 is an elongated rectangular arm with a first end 38b, a second end 38c, and an intermediate portion 38a therebetween. In the illustrated embodiment, the first end 38b of the holding arm 38 is attached to the back wall 20 of the retainer housing 14 to form a cantilever that biases the fastener 54 in a downward direction to restrain vertical movement of the fastener 54 when the fastener 54 is fully inserted into the retainer housing 14. Alternatively, the holding arm 38 can be attached to the sidewalls 16, 18 or the base 22 to form the holding arm. The second end 38c of the holding arm 38 extends past the first and second walls 40, 42 and extends towards the base 22 to define a hook-like structure that restrains lateral movement of the fastener 54 when the fastener 54 is fully inserted into the retainer housing 14. However, it can be appreciated that the holding arm 38 is not limited to having a second end 38c that extends towards the base 22, but can be any desired structure so long as the desired structure restrains lateral movement of the fastener 54 when the fastener 54 is fully inserted into the retainer housing 14. It should be realized that the vertical positioning of the holding arm 38 can be anywhere along the back wall 20 of the retainer housing 14. The biasing force provided by the holding arm 38 is a function of the vertical positioning of the holding arm 38. For example, the holding arm 38 will exert a greater force against the fastener 54 when positioned closer to the base 22 as compared to when the holding arm 38 is positioned at a distance further away from the base 22.

Because the distance between the walls 40, 42 is narrower than the stem 68, the stem 68 of the fastener 54 exerts a tangential force on the first and second walls 40, 42 during insertion of the fastener 54 into the insertion slot 24, thereby causing the first and second walls 40, 42 to move away from each other in the direction of the arrows 50, 52, respectively. However, the first and second cutouts 28, 30 allow the first and second walls 40, 42 to move away from each other more easily than conventional retaining structures when the fastener 54 is first inserted into the insertion slot 24. As the fastener 54 is further inserted into the insertion slot 24, the walls 40, 42 continue to deflect until a maximum point of deflection when the stem 68 of the fastener 54 reaches the narrowest portion between the walls 40, 42 of the insertion slot 24. At this point, the remaining cutouts 32, 34 and 36 assist in allowing the first and second walls 40, 42 to easily move away from each other. In addition, the top surface 64 of the fastener 54 abuts the holding arm 38 and exerts a force substantially normal, or perpendicular, to the holding arm 38 causing the holding arm 38 to move away from the base 22 of the retainer housing 14 as the fastener 54 is inserted into the retention portion 26. Once the fastener 54 is completely inserted into the retention portion 26, the first and second walls 40, 42 and the holding arm 38 substantially return to their initial positions due to the resilient nature of the material used for the retention structure 10.

Another aspect of the invention is that the fastener 54 is prevented from lateral (horizontal) and vertical movement once the fastener 54 is completely inserted into the retention portion 26. Specifically, the holding arm 38 abuts the top surface 64 of the fastener 54, while the bottom surface of the fastener 54 rests on the base 22 of the retention housing 14, thereby restricting vertical movement of the fastener 54. In addition, the second end 38c of the holding arm 38 restricts lateral movement of the fastener 54, thereby preventing the fastener 54 from disengaging from the retention housing 14 once inserted into the retention housing 14.

In the illustrated embodiment, the cross-sectional shape of the stem 68 of the fastener 54 is substantially circular. However it will be appreciated that the retention structure 10, and in particular the retention portion 26, can be designed with any desired geometric shape to accommodate any desired shape of the fastener 54. For example, the stem 68 can have a rectangular or square cross-sectional shape, and the retention portion 26 can have a corresponding shape to accommodate the stem 68. Further, it will be appreciated that the invention is not limited to retaining a fastener, and that the invention can be practiced to retain objects other than fasteners.

While the invention has been specifically described in connection with certain specific embodiments thereof, it is to be understood that this is by way of illustration and not of limitation, and the scope of the appended claims should be construed as broadly as the prior art will permit.

What is claimed is:

1. A retention structure, comprising:
    a retainer housing defined by a first sidewall, a second sidewall, a back wall, and a base, said first sidewall, said second sidewall and said back wall extending from a substrate to said base, said base including an insertion slot and a retention portion for retaining an object; and
    a holding arm attached to said retainer housing and having a first end, a second end and an intermediate portion therebetween.

2. The retention structure according to claim 1, wherein said insertion slot includes first and second walls angled inwardly toward each other to help guide said object when inserted into said retention portion.

3. The retention structure according to claim 1, wherein said retention structure defines a substantially circular shape on said base of said retainer housing.

4. The retention structure according to claim 1, wherein said retention portion includes at least one cutout.

5. The retention structure according to claim 1, wherein said intermediate portion of said holding arm abuts a top surface of said object, thereby restraining vertical movement of said object when substantially inserted into said retention portion of said base.

6. The retention structure according to claim 1, wherein said second end of said holding arm extends toward said base and restrains lateral movement of said object when substantially inserted into said retention portion of said base.

7. The fastener assembly according to claim 1, wherein said first end of said holding arm is attached to said back wall of said retainer housing to form a cantilever.

8. A retention structure, comprising:
    a retainer housing defined by a first sidewall, a second sidewall, a back wall, and a base, said first sidewall, said second sidewall and said back wall extending from a substrate to said base, said base including an insertion slot and a retention portion for retaining an object, said retention portion includes a plurality of cutouts forming a corresponding number of walls therebetween, and a holding arm attached to said retainer housing.

9. The retention structure according to claim 8, wherein said insertion slot includes first and second walls angled inwardly toward each other to help guide said object when inserted into said retention portion.

10. The retention structure according to claim 8, wherein an intermediate portion of said holding arm abuts a top surface of said object, thereby restraining vertical movement of said object when substantially inserted into said retention portion of said base.

11. The retention structure according to claim 8, wherein one end of said holding arm extends toward said base and restrains lateral movement of said object when substantially inserted into said retention portion of said base.

12. The fastener assembly according to claim 8, wherein one end of said holding arm is attached to said back wall of said retainer housing to form a cantilever.

13. A fastener assembly, comprising:
    a substrate;
    a retainer housing defined by a first sidewall, a second sidewall, a back wall, and a base, said first sidewall, said second sidewall and said back wall extending from said substrate to said base, said base including an insertion slot and a retention portion for retaining an object; and
    a holding arm attached to said retainer housing and having a first end, a second end and an intermediate portion therebetween.

14. The fastener assembly according to claim 13, wherein said insertion slot includes first and second walls angled inwardly toward each other to help guide said object when inserted into said retention portion.

15. The fastener assembly according to claim 13, wherein said retention structure defines a substantially circular shape on said base of said retainer housing.

16. The fastener assembly according to claim 13, wherein said retention portion includes at least one cutout extending from said substantially circular shape.

17. The fastener assembly according to claim 13, wherein said intermediate portion of said holding arm abuts a top surface of said object, thereby restraining vertical movement of said object when substantially inserted into said retention portion of said base.

18. The fastener assembly according to claim 13, wherein one end of said holding arm extends toward said base and restrains lateral movement of said object when substantially inserted into said retention portion of said base.

19. The fastener assembly according to claim 13, wherein said first end of said holding arm is attached to said back wall of said retainer housing to form a cantilever.

* * * * *